UNITED STATES PATENT OFFICE.

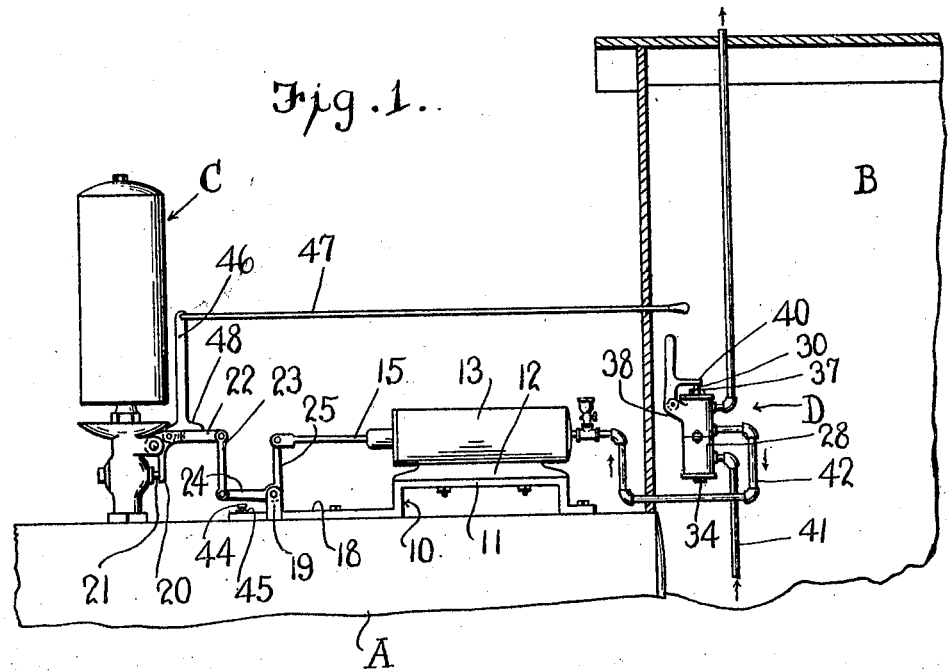
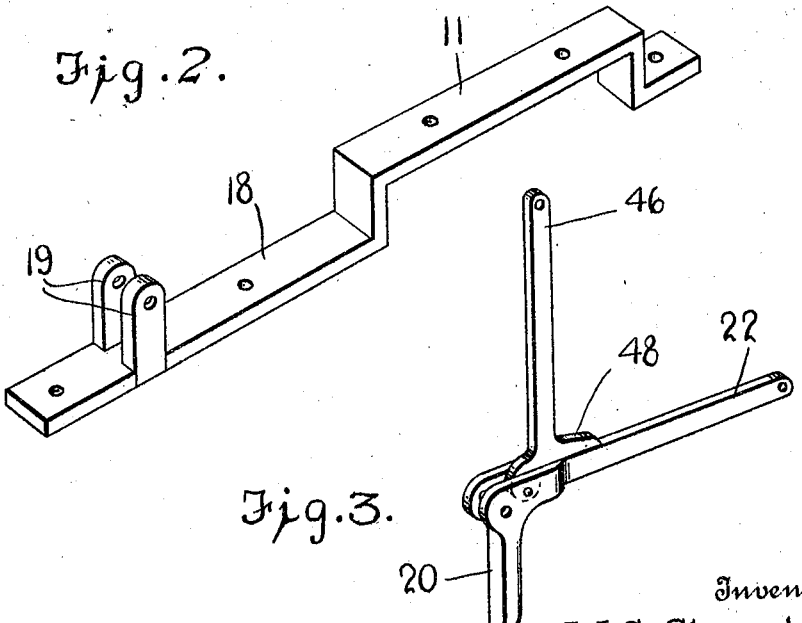

WILLIAM C. CHAMBERS, OF CICERO, ILLINOIS.

VALVE-OPERATING MECHANISM.

1,413,097. Specification of Letters Patent. Patented Apr. 18, 1922.

Application filed May 26, 1919. Serial No. 299,687.

*To all whom it may concern:*

Be it known that I, WILLIAM C. CHAMBERS, a citizen of the United States, residing at Cicero, in the county of Cook and State of Illinois, have invented new and useful Improvements in Valve-Operating Mechanism, of which the following is a specification.

This invention relates to locomotives and has particular application to the whistle or signal therefor.

The invention aims to provide an air actuated means for controlling the sound end of the signal, including a manually operable element disposed within the cab in juxtaposition to the air brake valve in convenient reach of the operator.

In carrying out my invention, I also provide a means whereby the degree of opening of the signal valve may be regulated to vary the sound of the signal.

Another object of the invention resides in the provision of means disposed in convenient reach of the engineer, for operating the signal independently of the air controlled means.

The nature and advantages of the invention will be more readily apparent when the following detailed description is taken in connection with the accompanying drawing, the invention residing in the construction, combination and arrangement of parts, as claimed.

In the drawings forming part of this specification, like numerals of reference indicate similar parts in the several views and wherein:—

Figure 1 is a fragmentary view of the locomotive showing the application of my invention thereto.

Figure 2 is a detail view of the bracket for supporting the operating cylinder.

Figure 3 is a detail view of the signal operating levers.

Referring to the drawings in detail A indicates a portion of a locomotive including the cab B and the whistle or signal C of wellknown construction, and associated with the boiler in the usual manner. The mechanism forming the subject matter of the invention essentially embodies a valve arranged within the cab B within convenient reach of the engineer, for controlling the admittance of air from the airline system into the operating cylinder, the piston within the latter operating to effect an opening and closing of the sliding valve of the signal C.

Suitably secured to the boiler of the locomotive is a substantially inverted U-shaped bracket 10, the cross piece 11 of which has riveted or otherwise suitably secured thereto a base 12 upon which rests the operating cylinder 13. A piston 14 is arranged to reciprocate within the cylinder 13, and includes a stem 15, which projects through a reduced tubular projection 16 carried by the head of the cylinder as shown. The reduced projection 16 forms a pocket for the reception of one end of a coiled spring 17, the latter encircling the piston rod 15 and having its opposite end bearing against the piston 14. The spring 17 normally maintains the piston 14 seated against the end of the cylinder 13 opposite the reduced projections 16. One limb of the U-shaped bracket is extended an appreciable distance at right angles thereto as at 18, and this portion of the bracket is provided with a lug 19 upon which is pivotally mounted a bell crank lever as shown. A reversely disposed bell crank lever is pivotally associated with the whistle or signal C and has one of its limbs 20 normally overlying the exposed extremity of the sliding valve stem 21 of the valve associated with the whistle. The remaining limb 22 of the valve crank lever is pivotally connected with the adjacent extremity of a link 23 which provides a connection between both of the bell crank levers, the opposite extremity of the link 23 being pivotally connected with the limb 24 of the bell crank lever carried by the bracket 11. The remaining limb 25 of the latter mentioned bell crank lever has its extremity received within the bifurcated end of the piston rod 15 and is pivotally connected thereto so that when the piston 14 is actuated or moved from its normal position toward the opposite end of the cylinder 13, the said bell crank levers are simultaneously actuated in a manner to cause the limb 20 of one of said levers to move the valve stem 21 in a direction to open the valve of the whistle or signal.

Mounted in any suitable manner within the cab B and arranged in juxtaposition to the air brake valve is a valve D which controls the operation of the piston 14. An air supply pipe 41 leading from the air brake system communicates with the valve casing 28 at a point beneath the valve 33, while leading from the casing 28 at an intermediate point between the partitions 29 is an air supply pipe 42 establishing communication between the valve casing 28 and one end of the operating cylinder 13.

As hereinabove stated the piston 14 is normally arranged at that end of the cylinder with which the pipe 42 communicates, and consequently as the air is introduced into the cylinder 13 the piston 14 is moved toward the opposite end thereof. During this movement of the piston 14 the bell crank lever carried by the bracket 10 is rocked upon its pivot, and through the instrumentality of the connecting links 23 a similar movement is imparted to the bell crank lever carried by the whistle C. It is of course understood that the movement of this lever is such as to operate the valve stem 21 of the signal valve to permit of the blowing of the whistle.

Adjustably mounted upon the extension 18 of the bracket 10 is a flanged element 44 having a nut lock 45 associated therewith to hold the elements in any given position. The element 44 is disposed beneath the limb 24 of the bell crank lever carried by the bracket, and serves to limit the movement of said lever, whereby the degree of opening of the whistle valve may be regulated, to vary the sound of the whistle.

The invention also embodies a means for operating the whistle independently of the air controlled means hereinabove described, and to this end I make use of a lever 46 having one end pivotally connected with the limb 22 of the bell crank lever carried by the signal. The opposite end of the lever 46 is connected with a rod 47 which leads to the cab B and terminates in convenient reach of the engineer, whereby the lever 46 may be easily and readily actuated. The lever 46 is provided with an angularly disposed finger 48 arranged immediately above the limb 22 of the bell crank lever with which the lever 46 is pivotally connected. Consequently when the rod 47 is pulled upon to move the lever 46 the finger 48 thereof engages the bell crank lever, rocking the latter in the proper direction to effect a sounding of the signal. On the other hand however, the arrangement of parts permits the bell crank lever carried by the signal to be actuated by the air controlled means without any interference on part of the lever 46. I have devised a means whereby the signal or whistle C can be instantaneously and conveniently actuated by the engineer without necessitating any change in his position, thus allowing him to keep his head projected from the cab window to observe the signals over the course which he travels.

While I have shown and described what I consider the preferred embodiment of the invention, I desire to have it understood that I do not limit myself to this exact construction, as the same is merely illustrative, and such changes may be resorted to when desired as fall within the scope of what is claimed.

What I claim is:—

The combination with a valve including a sliding stem, of means for operating the valve, said means including a cylinder, a piston arranged to reciprocate within the cylinder, a piston rod projecting from one end of the cylinder, a source of fluid pressure communicating with the cylinder, means for controlling said communication, a bell crank lever fulcrumed on the valve casing and having one branch contacting the said said valve stem, a reversely disposed bell crank lever having one branch pivotally connected with the adjacent extremity of the piston rod, a link pivotally connecting the remaining two branches of the respective bell crank levers, whereby the valve is opened upon movement of the piston from its initial position, and means for actuating said valve independently of the fluid actuated means.

In testimony whereof I affix my signature.

WILLIAM C. CHAMBERS.